United States Patent [19]
Bernstein et al.

[11] Patent Number: 4,803,619
[45] Date of Patent: Feb. 7, 1989

[54] DIGITAL DATA PROCESSING SYSTEM INCORPORATING APPARATUS FOR RESOLVING NAMES

[76] Inventors: David H. Bernstein, 41 Bay Colony Dr., Ashland, Mass. 01721; Walter A. Wallach, 1336 Medfield Rd., Raleigh, N.C. 27607; Michael S. Richmond, Fearrington Post Box, Pittsboro, N.C. 27312; John K. Ahlstrom, 1309 San Domar, Mountain View, Calif. 94043; John F. Pilat, 1308 Ravenhurst Dr., Raleigh, N.C. 27609; David A. Farber, 1700 Lakewood Ave., Durham, N.C. 27707; Richard A. Belgard, 21250 Glennmont Dr., Saratoga, Calif. 95070; Richard G. Bratt, 9 Brook Trail Rd., Wayland, Mass. 01778

[21] Appl. No.: 877,699

[22] Filed: Jun. 20, 1986

Related U.S. Application Data

[63] Continuation of Ser. No. 589,401, Mar. 15, 1984, abandoned, which is a continuation of Ser. No. 266,533, May 22, 1981, abandoned.

[51] Int. Cl.$^4$ .................... G06F 13/00; G06F 09/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,614,740 | 10/1971 | Delagi | 364/200 |
| 3,805,247 | 4/1974 | Zucker et al. | 364/200 |
| 4,084,227 | 4/1978 | Bennett et al. | 364/200 |
| 4,215,407 | 7/1980 | Gomola et al. | 364/200 |
| 4,286,320 | 8/1981 | Ott | 364/200 |
| 4,297,743 | 10/1981 | Appell et al. | 364/200 |

Primary Examiner—Eddie P. Chan

[57] ABSTRACT

Apparatus in a digital computer system capable of performing a call operation and a return operation for obtaining addresses of data from names representing the data. Each name is permanently associated with a procedure containing instructions to which the digital computer system responds. Each name further corresponds to a name table entry which is permanently associated with the same procedure. The corresponding name table entry for a name specifies how a base address and a displacement are to be derived using a plurality of current base addresses. The values of these addresses change only when the computer system executes a call operation suspending a current execution of a procedure and commencing another current execution or a return operation terminating the current execution and resuming the execution which was suspended to commence the terminated execution. The operation of resolving a name, i.e., obtaining the address of the data represented by the name, is performed by name interpretation apparatus in processors of the data processing system. In response to a name, the name interpretation apparatus locates the name table entry corresponding to the name fetches the name table entry, calculates the base address and the displacement using the name table entry and the current architectural base addresses, and then adds the base address to the displacement to obtain the address of the data represented by the name.

17 Claims, 1 Drawing Sheet

DIGITAL DATA PROCESSING SYSTEM INCORPORATING APPARATUS FOR RESOLVING NAMES

CROSS REFERENCE TO RELATED APPLICATIONS

This is a continuation of co-pending application Ser. No. 589,401 filed on Mar. 15, 1984, (now abandoned) which was a continuation of application Ser. No. 266,533 filed May 22, 1981 (now abandoned).

BACKGROUND OF THE INVENTION

1. Field of the Invention

The present patent application is closely related to U.S. patent application Ser. No. 266,429 which is a parent application of Ser. No. 647,271, now U.S. Pat. No. 4,661,903 and U.S. Ser. No. 266,424, which is a parent application of Ser. No. 580,772, now abandoned both filed on even date with the present application and assigned to the assignee of the present application.

The present invention relates generally to digital computer systems and more specifically co systems for representing data by means of operands and obtaining the address of the represented data from the operands.

2. Description of Prior Art

A recurring problem in the design of digital computer systems is the manner in which data to be processed by the computer system is to be represented in the instructions to which the processor responds. In order to process an item of data, the processor requires at a minimum the address of the item. However, it is generally impractical to simply include the address in the instruction. First, the locations of many items of data are not known until a program is actually executed, and consequently, cannot be included in the program's instructions. Second, when the address is included in the instruction, the instruction will operate correctly only in a single addressing environment. Such a restriction bars the sharing of programs by different users and further bars the use of procedures which may be called at various points in a program.

In the prior art, the above problems have been overcome by techniques such as base-displacement addressing and descriptions. In base-displacement addressing, utilized for example in the IBM 360-370 family of digital computer systems, the processor contains one or more base registers. Certain instructions permit the programmer to load the base registers with addresses obtained from memory or computed in the processor. Addresses of data may then be represented in instructions by specifying one of the base registers and a displacement from whatever address is currently stored in the base register. The address of the data is obtained by adding the specified displacement to the current value of the specified base register. Since the base registers may be set during execution of a program, addresses which are not known until the program is executed may be calculated by first setting a base register to the proper value and then specifying a displacement relative to the base address. Further, since the base registers may be set to different values for different executions of a program, programs are independent of a specific addressing environment.

Base-displacement addressing is not well-suited to dealing with data items whose addresses are determined by complex computations dependent on values which are not known until the program is executed. For example, the address of an array element is found by obtaining an index value from memory, multiplying the size of an element in the array by the index value, and adding the result to the address of the beginning of the array. In base-displacement addressing, sequences of instructions specifying these computations and setting the base registers to the proper values must be executed each time a program processes an element of an array. Consequently, programs dealing with data such as array elements are much longer than those dealing with data requiring less-complex address computations.

Descriptions, as implemented in the Burroughs B1700 processor and disclosed in U.S. Pat. No. 3,805,247, Zucker, et al., Apr. 16, 1974, entitled *Description Driven Microprogrammable Multiprocessor System*, solve the above-cited problems of base-displacement addressing schemes when complex address computations are required. In the system disclosed in Zucker et al., data items are represented in instructions by specifying a name register and a description address. Descriptions are data in memory which are associated with a specific execution of a program and which are used to calculate the addresses for that execution of the program. Where complex calculations are required, one description may refer to another. The name register specified in the instruction contains data allowing the specific location of a data item in an area specified by the description located by the description address. The address of the represented data item is computed using the information in the description specified in the instruction, descriptions referred to through that description, and the information in the name register specified in the instruction. Since one description may refer to another, no more instructions are needed in programs involving data items requiring complex address computations than in those requiring only simple address computations. Further, while instructions for complex address computations must be repeated each time the address computation is performed, a given description may be used to calculate addresses for many different instructions.

There are two disadvantages to descriptions: first, they must be created anew each time a program is executed; second, they contain memory management and protection information which is subject to change while a program is being executed; consequently, even though the address of a data item may remain the same throughout the execution of the program, the address cannot be easily encached.

The present invention provides data processing system improvements and features which solve the above-described problems and limitations.

SUMMARY OF THE INVENTION

The present invention relates generally to digital computer systems and more specifically to apparatus for deriving the address of a data item from an operand representing the data item.

In the present invention, data items may be specified by means of names permanently associated with procedures. Each name corresponds to a name table entry permanently associated with the same procedure with which the name is associated. The corresponding name table entry indicates how a base address and a displacement may be derived. When the displacement is added to the base address, the result is the address of the item represented by the name.

The base address is specified with reference to a set of architectural base addresses whose values change only when the digital computer system executes a call instruction beginning an execution of a procedure or a return instruction terminating an execution of a procedure.

The operation of obtaining the address of data represented by a name from the name is called resolving the name. The operation is performed in the digital computer system of the present invention by name interpretation apparatus which operates under microde control. The name interpretation apparatus resolves a name by locating the name table entry associated with the name and using the information in the name table entry and the current values of the architectural base addresses to calculate the base address and the displacement and then obtain the address of the item represented by the name by adding the displacement to the base address. The name interpretation apparatus may further perform the operation of name evaluation. In name evaluation, the address resulting from the name resolve operation is provided to the memory system of the digital computer system and the data represented by the name fetched to the processor.

Name table entries in the present invention may themselves includes names associated with other name table entries in the the name table. For example, a name table entry may specify a base address by means of an included name representing a pointer. In this case, the name interpretation apparatus resolves the name corresponding to the name table entry by evaluating the included name to obtain the base address and then adding the displacement to the base address. The name table entry for the included name may itself contain included names, and thus, the resolution of a name may involve the resolution or evaluation of any number of names. The name interpretation apparatus deals with included names by evaluating or resolving them recursively.

The set of architectural base addresses in the present invention includes three addresses: a procedure base address from which locations in the procedure currently being executed are calculated, a frame address from which locations in the stack frame corresponding the the current execution are calculated, and a static data address from which locations in a static data area associated with a set of procedure executions performed by a single process are calculated. The static data area address and the procedure base address are derived from information in a procedure environment descriptor associated with each procedure. The frame address changes each time a call or return instruction is executed; the procedure base address and the static data area address may change only when a call or return commences or resumes execution of a procedure having a procedure environment descriptor different from that of the procedure containing the call instruction or the return instruction.

Other aspects of the present invention include the specification of base addresses in name table entries in the following fashions:

By means of an architectural base address specifier specifying one of the architectural base addresses.

By means of an architectural base address specifier and a pointer location specifier specifying the displacement of a pointer from the specifier architectural base address. The pointer is then the base address.

By means of an included name which is resolved to obtain the base address.

By means of an included name which is evaluated to obtain a pointer which is the base address.

Displacements, too, may be specified by means of included names. These included names are evaluated to obtain the displacement. In name table entries for array elements, finally, the displacement is calculated by multiplying an index value by an inter-element displacement value. In the present invention, either or both may be names.

In the following detailed description of the computer system in which the present invention is embodied, a description of a preferred embodiment of the present invention may be found in Chapter 3, Section B (pages 717, line 20 through 744, line 11) and in the figures referred to therein.

It is thus an object of the invention to provide an improved digital data processing system.

It is another object of the invention to provide improved means for representing data items in computer programs.

It is an additional object of the invention to provide improved means for computing the addresses of data items in computer programs.

It is a further object of the invention to provide means for computing the addresses of data items in computer programs which employ architectural base addresses which change only upon execution of call and return operations.

It is yet another object of the invention to provide improved means for specifying addresses of data items in terms of a base address and a displacement therefrom.

It is a further additional object of the invention to provide improved means for specifying addresses of elements of compound data items.

It is still another object of the invention to provide recursive means for calculating addresses of data items.

Other objects, advantages and features of the present invention will be understood by those of ordinary skill in the art, after referring to the following detailed description of the preferred embodiments and drawings wherein:

BRIEF DESCRIPTION OF DRAWINGS

The figure numbers in this application have two components, one indicating the chapter the figure refers to and the other the sequential number of the figure in the chapter. Thus, FIGS. 1 through 20 refer to the Introduction, 101 to 110 to Chapter 1, and so forth. There are no FIGS. 21-100, 111-200, 275-300, or 308-400 in the application.

Figure 1:
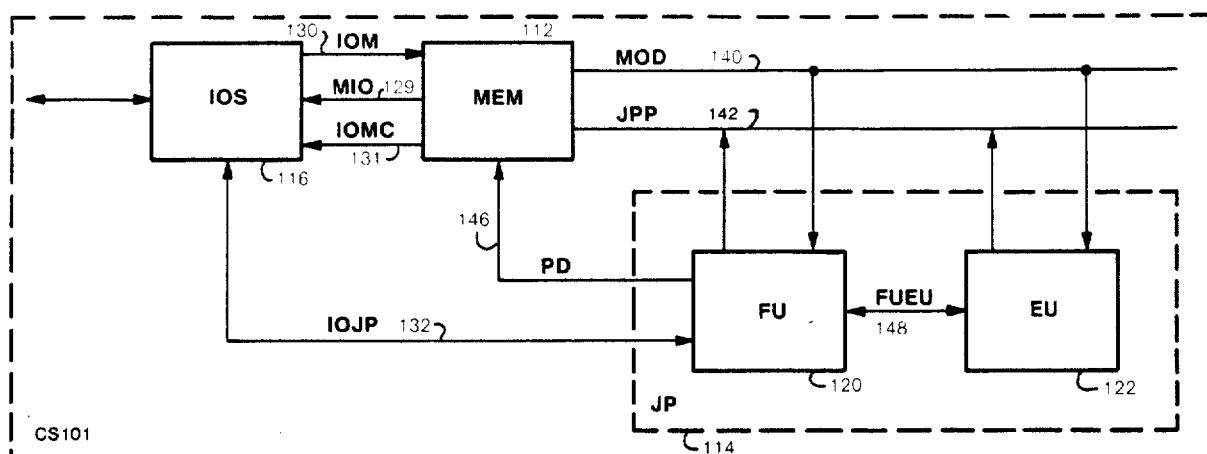
FIG. 1 is a partial block diagram of a computer system incorporating the present invention.

This application incorporates by reference the entire application, Ser. No. 616,773, filed on May 31, 1984, of Bratt et al., (a continuation of Ser. No. 266,404, filed on May 22, 1981) now issued as U.S. Pat. No. 4,525,780, on June 25, 1985.

More particularly, attention is directed to FIGS. 3, 4, 6, 8-10, 101, 103, 270-272, 301-305, 468, 469 and 471 of the drawings in U.S. Pat. No. 4,525,780 and to that part of the descriptive portions of the specification thereof, particularly at columns 21, 22, 28-32, 54, 305-312, 320, 326-328, 332, 334-344, 348, 476-478 and 484-490 which relate to the subject matter of the claims herein.

What is claimed is:

1. In a digital computer system including
  (1) processor means for performing operations on data items by executing procedures of data items containing instructions by responding to the instructions contained in each said procedure when executing said procedure, and (2) memory means for storing said data items and providing said data items to said processor means in response to memory signals from said processor means, and wherein each of said memory signals derived from a descriptor including at least an address of one of said data items in said memory means, and said data items further include (a) a plurality of process data items, each process data item being associated with the execution of specified procedures, and including (i) one or more frames of said process data items, each frame corresponding to the execution of one of said specified procedures, and (ii) a static data area of said process data items which are not associated with the execution of any specified procedure and further including means for deriving certain of said addresses in said descriptors by using a plurality of architectural base addresses which are contained in a region of said memory means associated with the procedure which said processor means is currently executing, said plurality of architectural base addresses including (a) a frame address from which locations in the frame associated with the currently executed procedure are calculated, (b) a static data area address from which locations in the static data area associated with the currently executed procedure are calculated, and (c) a procedure address from which locations in the procedure currently being executed are calculated, means for performing a call operation suspending the execution of a current procedure and commencing the execution of another procedure and means for performing a return operation terminating the execution of said other procedure and resuming the execution of the suspended procedure, said call operation performing means including, (a) means for saving the plurality of architectural base addresses associated with the execution of the current procedure and a program counter value specifying the next instruction to be executed in said current procedure when said call operation occurs, (b) means for locating a region of said memory means associated with a procedure whose execution is being commenced by said call operation, (c) means for obtaining a plurality of architectural base addresses from the region of said memory means associated with the procedure whose execution is being commenced by said call operation, and (d) means for obtaining a program counter value for the first instruction in the procedure whose execution is being commenced by said call operation and commencing the execution of said procedure using the plurality of architectual base addresses associated with the procedure whose execution is being commenced in order to obtain the instructions for said procedure; and said return operation performing means including, means for restoring the saved plurality of architectural base addresses associated with the procedure whose execution is being resumed and the program counter value specifying the next instruction to be executed when the execution of the procedure which was suspended by said call instruction is resumed and resuming the execution of said suspended procedure containing the next instruction using said saved architectural base addresses.

2. In the system of claim 1, and wherein:

said data items further include a plurality of procedure environment descriptors, each procedure environment descriptor being associated with at least one procedure and containing data items from which a procedure base address for any procedure associated with said procedure environment descriptor and a static area data address for the execution of any said associated procedure are derived; and if the procedure whose execution is being commenced by said call operation has the same proedure environment descriptor as the procedure environment descriptor for the procedure whose execution is being suspended by said call operation, said means for obtaining a plurality of architectural base addresses includes (i) means for deriving a static data area address and a procedure base address using the procedure environment descriptor associated with the procedure whose execution is being commenced by said call operation, and (ii) means for obtaining a frame address for a new frame associated with the procedure whose execution is being commenced.

3. In a digital computer system including (A) memory means for performing memory operations including storing and providing items of data including procedures containing one or more instructions in response to memory signals, (B) processor means connected to said memory means for performing processor operations in response to said instructions, said processor operations including operations for deriving said memory signals from descriptors, each said descriptor including an address specifying a location in said memory means, and providing said memory signals to said memory means, and wherein said processor means includes (1) call operation means responsive to an instruction for suspending the execution of a current procedure and commencing the execution of another procedure; and (2) return operation means responsive to an instruction for terminating the execution of said another procedure and resuming the execution of said suspended procedure, and name resolution means for obtaining said descriptors, said name resolution means comprising:

(1) a region of said memory means accessible to said processor means for storing a current architectural base address, (2) means for changing said architectural base address only as a consequence of the operation of said call operation means and said return operation means;

(3) a plurality of name table means each containing a plurality of name table entries in said memory means, said name table means and the name table entries therein being permanently associated with a procedure, each of the data items associated with a said procedure being specified by a name corresponding to a name table entry in the name table means associated with said procedure, and each said corresponding name table entry containing information specifying how a descriptor for the data item represented by said name is to be obtained using said current architectural base address; and (4) name interpretation means in said processor means responsive to a name associated with the procedure currently being executed by said processor means for providing a descriptor for the data item represented by said name, said name interpretation means including means for interpreting the information in the name table entry corresponding to said name to obtain said current architectural base address: and means responsive to said current architectural base address for deriving said descriptor therefrom.

4. In the name interpretation means of claim 3, and wherein:

said instructions contain operation codes for controlling said processor means and certain of said instructions further contain names associated with an instruction sequence containing said instructions; and said name interpretation means further includes means for obtaining descriptors for the data items represented by names in said certain instructions under control of the operation codes in said certain instructions.

5. In the name resolution means of claim 3, and wherein:

said name interpretation means further includes means for deriving certain descriptors of represented data items by using only the current architectural base address and constant values contained in the name table entry corresponding to the name associated with said data item; and cache means for storing said certain descriptors and providing one of said certain descriptors in response to the name representing the data item specified by said one of said certain descriptors; and said name interpretation means producing a descriptor for the data item represented by a name by providing said name to said cache means and obtaining said descriptors from said cache means if said descriptor is one of the certain descriptors present in said cache means and otherwise producing a descriptor for said represented data item by using the information in the corresponding name table entry and then storing the descriptor for said represented data item in said cache means if the descriptor for said represented data item is not one of said certain descriptors.

6. In the name resolution means of claim 3, and wherein said call operation means includes means for saving the architectural base address for said current procedure, the execution of which is being suspended; and said return operation includes means for restoring the saved architectural base address for use when the execution of the suspended procedure is resumed.

7. In the name resolution means of claim 3, and wherein:

each said name table entry contains
(a) a base address specifier specifying how a base address is to be derived; and
(b) a displacement address specifier specifying how a displacement value specifying a displacement from said base address is to be derived; and said name interpretation means interprets a name table entry by
(a) deriving a base address as specified by the base address specifier in the name table entry corresponding to a name received by said name interpretation means; and
(b) deriving a displacement value specified by the displacement address specifier in the name table entry corresponding to said received name, and thereupon by
(c) adding said displacement value to said base address to produce a combined address for the data item represented by said name; and
(d) producing the descriptor for said data item using said combined address.

8. In the name resolution means of claim 7, and wherein:

said data items further include pointers, each pointer representing an address; said pointers include linkage pointers located at negative displacements from an architectural base address representing address numbers lower than that of said architectural base address, the base address specifiers in a first plurality of name table entries specify a linkage pointer as a base address; and said name interpretation means responds to names corresponding to said first name table entries by
(a) deriving a descriptor for said linkage pointer from said base address specifier,
(b) deriving a second memory signal from said linkage pointer descriptor, and
(c) receiving the linkage pointer provided by said memory means in response to said second memory signal, whereby the address represented by said linkage pointer is said base address.

9. In the name resolution means of claim 8, and wherein:

a base address specifier in said first name table entries includes
(a) an architectural base address specifier specifying one of a plurality of current architectural base addresses; and
(b) a linkage pointer displacement value specifying a negative displacement of said linkage pointer from said one of said plurality of current architectural base addresses; and said name interpretation means derives said linkage pointer descriptor by adding the negative displacement contained in said base address specifier to said one of said plurality of current architectural base addresses.

10. In the name resolution means of claim 7, and wherein:

said plurality of current architectural base addresses consists of three said addresses.

11. In the name resolution means of claim 10, and wherein:

said call operation saves said plurality of current architectural base addresses before obtaining said plurality of current architectural base addresses for said another current execution commenced by said call operation and said return operated restores said saved plurality of current architectural base addresses for said resumed execution.

12. In the name resolution means of claim 11, and wherein:

said data items further includes a plurality of procedure environment descriptors, each said procedure environment descriptor being associated with at least one procedure and containing (a) a procedure base address specifier specifying how a procedure base address for any procedure associated with said procedure environment descriptor is to be derived; and (b) a static data area address specifier specifying how said static data area address for the execution of any said associated procedure is to be derived; and said call operation means includes means for deriving a procedure base address from said procedure base specifier and for deriving a static data area address from said static data area address specifier when the procedure whose execution is being commenced by said call operation has a different procedure environment descriptor from the procedure whose execution is being suspended by said call operation.

13. In the name resolution means of claim 7, and wherein:

said data items further include a plurality of process data items, each process data item containing data items associated with the executions of certain procedures, each of said process data items including (a) at least one frame of said data items each frame corresponding only to the execution of one of said certain procedures; and (b) a static data area of data items associated at least with said current execution; and each of said plurality of current architectural base addresses includes a frame address, a static data address, and a procedure base address, and further including (a) means for adding said displacement values to said frame address to specify locations in the frame corresponding to the current execution, (b) means for adding said displacement values to said static data address to specify locations in the static data area associated with said current execution, and (c) means for adding said displacement values to said procedure base address to specify locations in the procedure currently being executed.

14. In the name resolution means of claim 7, and wherein:

a base address specifier in said first name table entries includes a name corresponding to another name table entry; and said name interpretation means derives said base address when the corresponding name table entry is one of said first name table entries by interpretating said another name table entry and using the address in the descriptor obtained thereby as said base address.

15. In the name resolution means of claim 7, and wherein:

said data items include pointers, each pointer representing an address;

said name interpretation means further responds to a certain name and derives a memory signal using the descriptor for the data item represented by said name and receives the data item produced by said memory means in response to said memory signal;

a base specifier in a second plurality of name table entries includes a name representing a base pointer and corresponding to another name table entry associated with the same said procedure; and said name interpretation means derives said base address when said name table entry is one of said second name table entries by interpreting said another name table entry to obtain an address represented by said base pointer, said address being used as said base address.

16. In the name resolution means of claim 7, and wherein:

said data items include pointers, each pointer representing a pointer address;

a base address specifier in a third plurality of name table entries specifies a pointer address represented by a base pointer of said plurality of architectural base addresses, as said base address and includes (a) an architectural base address specifier specifying one of said plurality of architectural base addresses and (b) a base pointer displacement value; and said name interpretation means derives said base address when said corresponding name table entry is one of said third plurality of name table entries by obtaining the architectural base address specified by said architectural base specifier from said architectural base register means, by adding the displacement specified by said base pointer displacement value to said specified architectural base address to produce the descriptor for said base pointer, by using said base pointer descriptor to derive a memory signal to which said memory means responds by providing said base pointer, and by using the address represented by said base pointer as said base address.

17. In the name resolution means of claim 7, and wherein:

said data items include pointers, each pointer representing an address;

certain name table entries include a name corresponding to another name table entry associated with the procedure with which said name table entry containing said included name is associated;

same name interpretation means further interprets said another name table entry by using the descriptor therein to derive a memory signal for said data item and receiving the data item produced by said memory means in response to said memory signal;

said base address specifier alternatively specifies said base address in accordance with one of the following:

(a) an included name representing a data item whose address is said specified base address;

(b) an included name representing a base pointer which represents said base address, (c) an architectural base address specifier specifying one of said plurality of current architectural base addresses, or (d) said architectural base address specifier and a base pointer displacement specifier specifying a displacement of said base pointer from the architectural base address specified by said architectural base specifier;

each name table entry includes a processing specifier specifying which base specifier is used in said name table entry; and said name interpretation means derives said base address by alternatively
- (a) resolving said included name to obtain said base address when said base specifier is said included name and the address of the data item represented by said included name is said base address,
- (b) evaluating said included name to obtain said base address when said base specifier is said included name and said included name represents one said base pointer,
- (c) using the current architectural base address specified by said architectural base address specifier as said base address when said base specifier is said architectural base address specifier, or
- (d) adding said base pointer displacement value to the current architectural base address specified by said architectural base address specifier to obtain the address for said base pointer producing the descriptor for said base pointer, deriving a memory signal from said base pointer descriptor to which said memory responds by providing said base pointer, receiving said base pointer in said processing means, and using the address represented by said base pointer as said base address when said base specifier is said architectural base specifier and said base pointer displacement value, as specified by said processing specifier.

* * * * *